Figure 19:
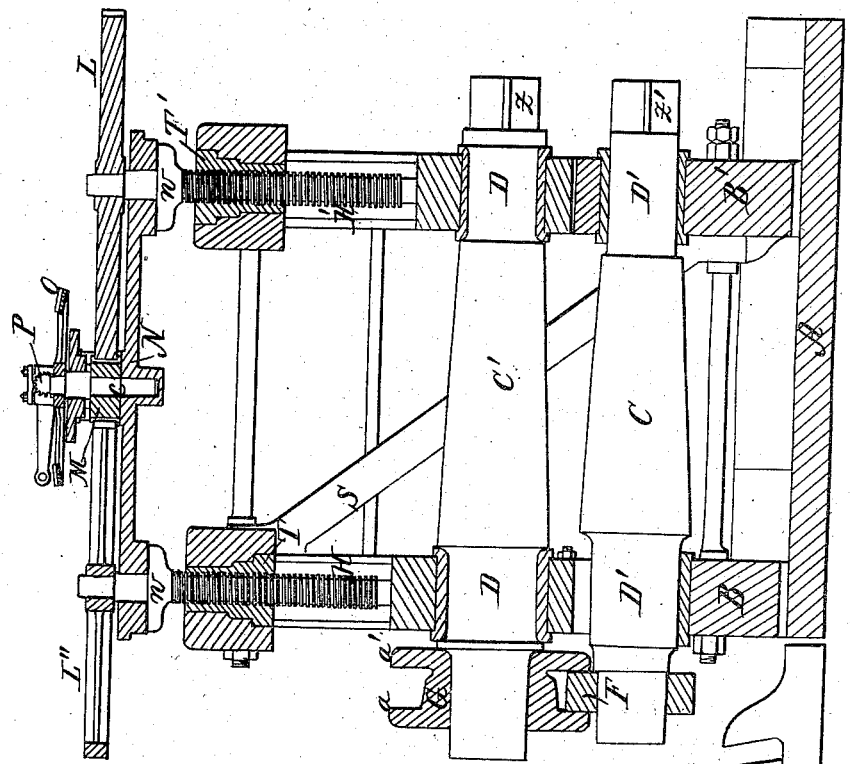

Sheet 1, 4 Sheets.
A. Krupp.
Wheel Tire.
N° 11,049.   Patented Jun. 6, 1854.
Fig. 1.
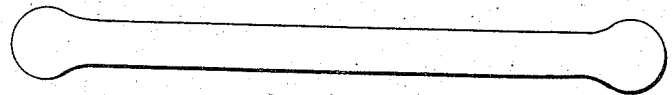
Fig. 2.
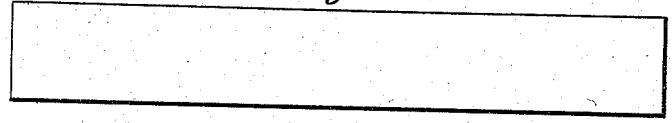
Fig. 2ᵈ.   Fig. 2ᵈ'.   Fig. 2ᵈ²'.
  
Fig. 3.
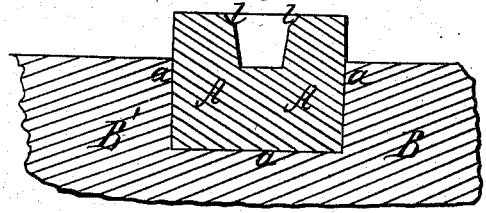
Fig. 4.
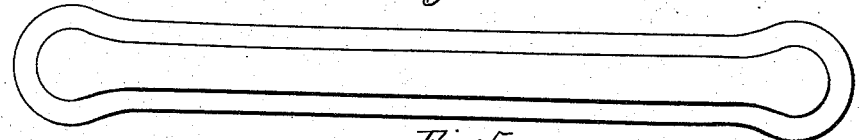
Fig. 5.
Fig. 6.
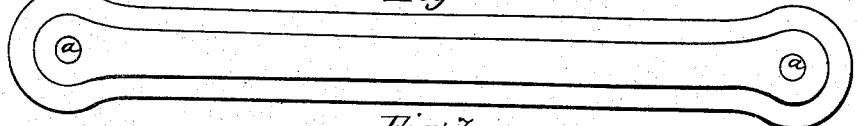
Fig. 7.
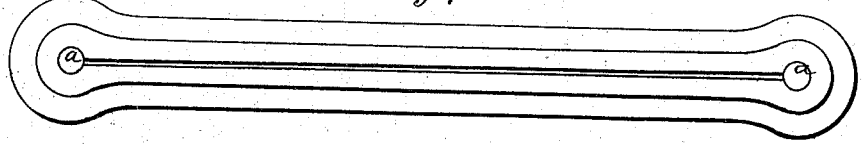

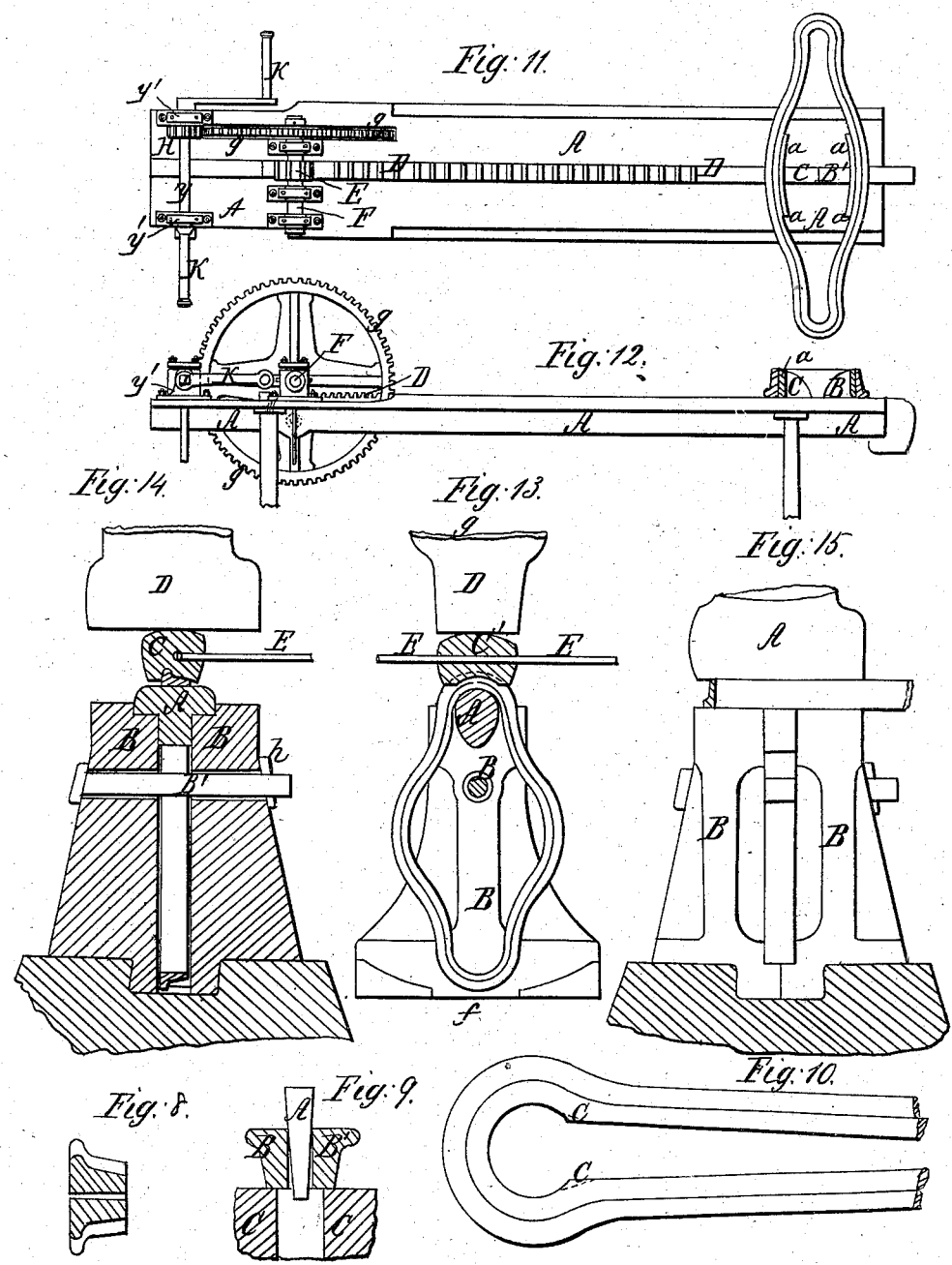

Sheet 3, 4 Sheets.
A. Krupp.
Wheel Tire.
N° 11,049.   Patented Jun. 6, 1854.
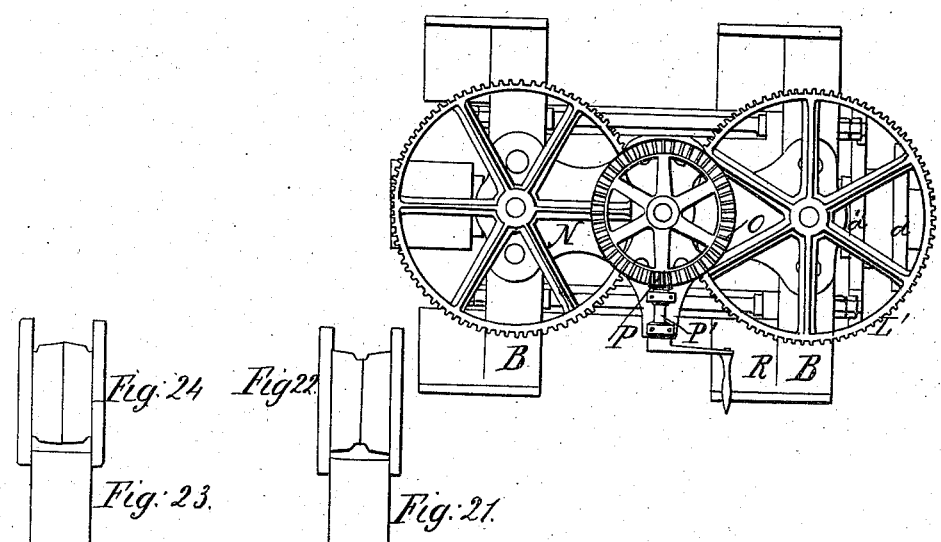
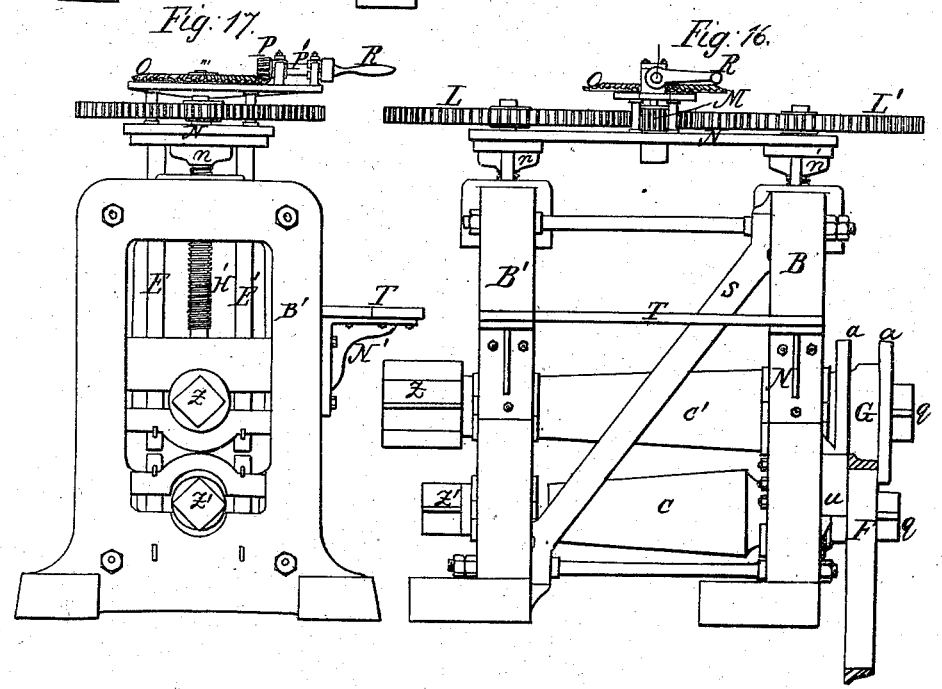

Sheet 4, 4 Sheets.

A. Krupp.
Wheel Tire.

Nº 11,049.   Patented Jun. 6, 1854.

UNITED STATES PATENT OFFICE.

ALFRED KRUPP, OF ESSEN, PRUSSIA.

MAKING CAR AND OTHER WHEEL TIRES.

Specification of Letters Patent No. 11,049, dated June 6, 1854.

*To all whom it may concern:*

Be it known that I, ALFRED KRUPP, of Essen, in Rhenish Prussia, have invented a new and improved description of tires, rims, or rings, for the purpose of applying the same to the wheels of railway and other carriages and purposes requiring them; and I do hereby declare that the following is a full and exact description thereof and of the method of manufacturing the same.

The nature of my invention consists in the manufacture and application of wheels, tires and hoops of cast-steel from one solid cast and without requiring any welding.

It is requisite in order to manufacture a good and perfect tire that sound cast steel should be used and for this purpose the head or top part of the ingot of cast steel as far as the hollow and porous portion resulting from the casting should be removed, as it would materially impair the perfection of the tire. For ordinary tires for railway wheels I cast the ingot of steel of from eight to ten inches square, or should it be found more desirable for other intended sizes I make the casting of a rectangular shape, the proportions in the size of which should be such as to contain the same or nearly the same proportionable number of square inches. These dimensions I have found best for tires of the ordinary description, but I do not wish to confine myself to that size, as other dimensions may be used.

The following observations refer to the necessary attention of heating the cast steel cautiously just as it is known to be requisite for the purpose of hammering, sufficient care being observed to insure to the finished tire the necessary compactness and toughness as in forging or rolling cast steel for other purposes and well understood by manufacturers of cast steel. After the ingot has been thus cast of the dimensions above described and of length sufficient to form a tire I forge it by means of a powerful hammer worked by steam or other motive power to the shape indicated in the drawings hereunto annexed where Figure 1 represents a plan and Fig. 2 a side view of the bar. This operation of forging gives to the ingot the necessary degree of compactness and toughness and for this reason the cast steel must be so much larger than the object into which it is to be forged. The proportions necessary to be observed and the mode of forging with the result are well understood by manufacturers of cast steel.

The cross section of the ingot should contain at least three times as many square inches as when finished by forging. The dimensions which I have found most desirable to forge the bar to when making a tire the interior diameter of which when turned and finished is four feet and of the cross section shown in Fig. 2ª are about four feet nine inches long, eight inches and a half in height and three inches and three quarters in breadth. These dimensions are only suppositional to give an example of the proportions between the rough and the finished tires. The ends of the bar are forged of the shape shown in Fig. 1, and about six inches across the center. These dimensions may be altered to suit different circumstances.

Fig. 3 represents the kind of swage which I use for giving the necessary shape to the bar out of which the tire is to be made. A is the swage which is supported upon a heavy block or anvil of metal B. The swage is free to slide backward and forward in the groove $a\ a$ formed in the anvil B when actuated by the workman. The object of this to and fro movement of the swage is to admit of every part of the bar being brought gradually under the head of the hammer.

Fig. 4 represents a plan and Fig. 5 a section indicating the shape which the bar assumes on coming from the anvil B.

The flanges on the tire are formed by means of the upper portions of the metal being driven down by the successive blows of the hammer until it fills out the hollow recesses $b,\ b$, in the swage, there being sufficient metal in the depth of the bar for that purpose. The process of hammering will reduce the depth of the bar to about five inches and a quarter, which is about the breadth of the intended tire when finished. The size of the flange will depend upon the size given to the hollow recesses $b\ b$, which may be made of any size and shape to suit the different kinds of tires which may be required. The two ends of the bar are forged of a circular shape, as shown, for the purpose hereinafter to be explained. After the bar has been thus formed it is submitted to the following operations: The two circular heads or ends have a hole drilled through each of them of about two inches in diameter (more or less) or the holes may be punched through them while the bar is in a heated state. Fig. 6 represents the bar showing the position of the holes a a. The bar is then cut or split through the center longitudinally between the holes a a, as represented in Fig. 7 and in section in Fig. 8, by means of an ordinary slotting machine or by means of circular saws or by any other analogous methods well understood by machinists. The bar is then nearly in a complete state and all that now remains is to open it out into the circular shape to form the tire which is performed in the following manner: The circular ends are first expanded to the extent of about six or eight inches by means of circular wedges similar to the one represented in Fig. 9, where A is the wedge, B the section of the circular end of the bar and C the anvil. The wedges are driven in by means of a hammer or by pressure while the bar is in a heated state. It will then be necessary to remove the corners b b, Fig. 10, and shape them to a curve parallel to the outer curve of the bar, so that when the bar is opened out the inner surface of it shall be uniform and smooth. After this operation of expanding the circular ends it will be found necessary to transfer the bar to an anvil, hereinafter to be explained, in order to hammer it and so compress and equalize the metal. The slot is also partially opened out by driving in keys or wedges after the bar has been previously heated to the proper degree in a furnace. The bar is then ready to be transferred to the machine commonly known as a draw-bench and indicated in the drawings, where Fig. 11 represents a plan and Fig. 12 a side elevation thereof, for the purpose of being expanded. A is a strong foundation or base plate, to which is securely attached the hook B, and C is a similar hook. These hooks are made sufficiently strong to resist the pressure which is necessary to open out the bar. The partially opened bar is then placed over them in the manner shown, with the strips of metal a a placed between them and the inner face of the bar in order to prevent the face from being indented and injured thereby during the process of opening. The hook C is formed upon one end of a toothed rack D, which slides in a groove in the foundation plate A. E is a pinion which gears into the teeth of the rack D. This pinion is keyed upon a shaft F running across the machine and carrying a spur wheel g, which is driven by means of a second pinion H upon the shaft I. This shaft I turns in the plummer block I' and is actuated by the winches K K. Should it be found desirable the shaft I may be driven by means of gearing from a steam engine or any other prime motor. The action of this machine has the effect when in operation of opening out the bar, so as to form the tire. It may be found necessary during the operation of expanding the bar to transfer it occasionally to an anvil, represented in Fig. 13, a front elevation, and Fig. 14, a side view, for the purpose of equalizing and compressing the metal forming the ends as before explained. After the bar has been expanded as far as it is found requisite it is again placed upon the anvil before referred to and operated upon in the following manner: A is the swage, which is supported by its two ends upon heavy anvils or swage blocks B B'. The opening between the anvils B B' is to admit of the partially formed tire being placed upon the swage, which is first removed for that purpose. B' is a strong tie bolt which passes through both the anvils B B' for the purpose of rendering them more firm and prevent them from shaking. This bolt B', as well as the swage A, must be removed each time that it is required to place upon or take off a tire from the swage A. C is a top swage the under face of which is cut to correspond to the face of the tire and so prevent it from being injured by the successive blows of the hammer D. E E are rods attached to the top swage C for the purpose of guiding it and to enable the workmen to hold it in its place. The object of this hammering is to equalize the thickness of all parts of the tire and also to give to it a more perfectly circular shape. After the tire has been completed thus far it is laid in a horizontal position upon the anvil, as represented in Fig. 15, where the edges of the tire are rendered more perfect and any inequalities that may exist are reduced by the hammer A. By this means also the breadth of the tire can be reduced.

In order to insure the circularity of the tire before turning and facing it in the lathe, I subject it to a machine used for a similar purpose in making wrought iron wheels in the ordinary manner. This machine consists of several segmental pieces, which when together shall form a complete circle. These segments are capable of being moved by means of screws and wedges in a radial direction, so that when the heated tire is placed over and upon the outside of them and the necessary motion is imparted to the segments they will expand the tire to the required limit, thereby reducing any inequalities that may exist and also giving the necessary circularity, whereby a saving in both metal and labor is effected. After the tire has undergone this operation it is placed in a face lathe adapted for that purpose and turned in a similar way to finishing wrought iron wheels and it is then ready for being fixed by any of the methods usually adopted.

Secondly. Another mode which I adopt in the manufacture of tires for railway wheels is by means of a rolling mill, hereinafter to be exemplified and described.

Figure 20:
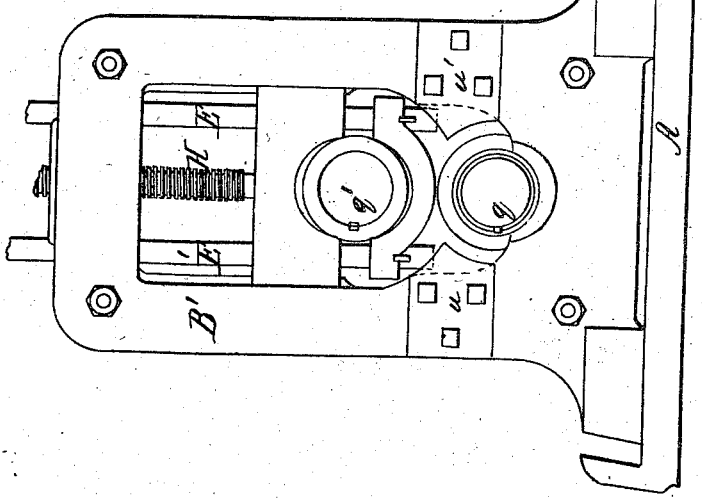

This method of forming tires after they have been forged will be found very useful as all the inequalities and differences in the thickness and breadth of the tire will be reduced and a material saving in both metal and labor thereby effected. The same method of rolling may also be applied to perform that part in the manufacture of tires which is done by hammering the bar down in the anvil before described and represented in Fig. 3 for forming the flange. It will, however, be found necessary in forming the tires by rolling to alter the relative dimensions of the forged bar for making a tire of the same size as the one already referred to namely four feet interior diameter. The dimensions I have adopted for this purpose are four feet six inches in the length, four and three quarter inches in height and seven and one quarter inches in breadth. The circular ends must be forged in the same proportion and are made eleven inches in breadth. Precisely the same operation is required of drilling or punching the holes of about three inches in diameter. The longitudinal slot is cut of about a quarter of an inch in width, as in the former case. The object of thus making the circular hole in each end of the bar larger than before is that when the bar is being expanded there shall be less strain and consequent injury to the inner surface which would otherwise take place owing to the increased thickness of the metal comprising the ends. I adopt the same method of expanding the bars and hammering the ends as hereinbefore exemplified and described, with this exception that the face of the top swage is plain on its under side because of there being no flange upon the tires or hoops in this stage of the operation of hammering. It will, however, be advantageous to give it a countercurve corresponding with the exterior periphery of the hoop and to the surface of the bottom swage, one corresponding to the interior periphery thereof. When the hoop is thus formed it is transferred to the machine next to be described for the purpose of having the flange given to it for forming it into a tire for railway wheels. Fig. 16 is a side elevation, Fig. 17 a back elevation, Fig. 18 a plan, Fig. 19 a sectional elevation and Fig. 20 a front view of this machine. A A is the foundation plate, B B' two upright standards or frames attached firmly to the foundation plate. C C' are two shafts turning in the bearing D D. These are supported in the manner shown in the back view in Fig 17 and sectional elevation in Fig. 19. The lower shaft C turns in bearings on the standards or frames B B', while the bearings of the upper shaft C' are suspended by the rods E E and are capable of being raised and lowered in the manner hereafter to be explained. Upon the ends of the shafts C C' and outside the framing are keyed two rollers F and G of the shape indicated in the drawings. The lower roller is made plain upon its periphery and of a width equal to the width of the tire when finished. The periphery of the upper roller G is turned of a shape corresponding to the cross section of the outer periphery of the tire for the purpose of giving to the hoop which is placed between them the necessary shape to form the flange and sole of the tire. The roller G is formed also with deep flanges $a\ a$, which embrace the upper portion of the lower roller F and serve to keep the hoop in its relative and proper position during the operation of rolling it into the form of the tire. H H are two strong screws the lower ends of which are attached to two sockets in the bearings of the upper shaft C in such a manner that they shall be free to revolve. These screws are tapped at their upper ends through strong nuts I I' fixed in the upper portion of the frames B B' and have keyed to them the spur wheels L L'. The flanges of the nuts I I' are placed in a position the reverse to one another—that is to say, the flange of the nut I is placed downward in the upper portion of the frame B, while the flange of the nut I' is placed uppermost in its respective frame B'. The reason for thus reversing the position of the flanges of the nuts is that when the hoop is placed between the rollers and while the operation of rolling is being performed the tendency of the end of the shaft nearest to the rollers is to be forced in an upward direction while the other end of the shaft is forced in a downward direction or reverse to the other end. The lower shaft is capable of being moved laterally in its bearings in order to adjust it to the action of the upper roller, but the lower roller F is always kept in its proper and relative position to the upper roller G by means of the flanges $a\ a$. M is a pinion mounted upon the shaft $c$, supported in the plate N. This plate N is supported at each of its two ends by the heads $w\ w'$ of the screws H H' and moves up and down with them. The pinion M gears into each of the spur wheels L L'. Upon the same shaft $c$ that carries the pinion M is keyed a bevel wheel O, into which works the bevel pinion P keyed upon the cross shaft P', which has fixed upon it the winch R for the purpose of working the train of wheels L L' M O and P. S is a stay for giving steadiness to the standard B' during the operation of rolling. T is a platform bolted to the frame B on which the workman stands to actuate the winch R. The action of this machine is as follows: The upper shaft C' with its roller G is first raised (by means of the toothed wheels through the workman turning the winch R) clear of the lower shaft C and roller F, so as to admit of a hoop prepared in the manner hereinbefore described and which has been heated to the proper degree of heat for cast steel being placed upon the lower roller F in the manner shown. The upper roller is then brought down by means of the workman turning the handle in the reverse direction until its surface bears upon the hoop. Motion is then given to the upper shaft and roller G by means of coupling the shaft to a steam engine or other prime motor in the ordinary manner of working rolling mills. Should it be found desirable at the commencement of rolling the hoop motion may be communicated as well to the lower shaft and roller F by means of a couple of toothed wheels moving in a particular frame and coupled on the one side with the main shaft of the motive power on the other side with the axles C C' usual in large rolling mills as the frictional contact between the upper and lower rollers on account of the smaller surface of the hoop in contact with the upper roller may not be sufficient to cause the lower roller to revolve and carry with it the hoop. This, however, will not be the case as soon as the flange is formed by the operation of rolling, as the whole surface of the molded periphery of the tire is then in its whole breadth in contact with the top roll. The friction or adhesion between the flanged top roller and the outside of the tire at first and afterward between the inside or sole of the tire and the bottom roll will then cause the motion of the whole, though only the top axle C' may be coupled with the driving power. The revolutions of the rollers cause that part of the hoop in contact therewith gradually to receive the countershape of the upper roller G, there being always a degree of pressure exerted upon the upper shaft by the workman, who continues to turn the winch R, so that the upper roller is lowered in an exact proportion to the compression of the hoop until it assumes the perfect shape of the intended tire. From the unequal diameter of the upper roller and the one side of the hoop which forms the periphery of the tire coming first into operation it gives to the hoop during its elongation and formation a tendency to bend inward toward the framing. This effect I propose to counteract by means of two pieces of metal U U', which project from the face of the frame B to the edge of the hoop when hanging perpendicularly from the lower roller F. These pieces of metal are also intended to have the effect of reducing the pressure inside against the flange $a$ and consequently lessen its wear. In rolling hoops for tires of large diameters it may be found expedient to place movable rollers, which shall bear upon each side of the diameter of the hoop and so prevent it from oscillating during the operation of rolling. When the hoop has been thus formed into a tire in the manner hereinbefore explained the upper roller and shaft are again raised and the tire removed, when another hoop heated to the proper degree is placed upon the lower roller and the operation of rolling recommenced.

Thirdly. For tires of small diameters and of light weight I propose making them in duplicate—that is to say, I forge the hoop of twice the breadth of cross section and pass it through rollers similar to those represented in Figs. 21, 22, 23 and 24, where the rollers are formed of sufficient width for two tires and the upper one has turned upon its periphery the countershape of the outer periphery of two tires as shown in Figs. 22 and 24. After the tires have been formed by a similar method of rolling as previously described they are cut in a lathe by a tool adopted for that purpose and so separated into two. Instead of the double tire being rolled with their flanges united, as indicated in Fig. 22', they may be rolled with the flanges on the outside, as represented in Fig. 24', and cut through the center by the method above described. By thus rolling the tires in pairs I am enabled to dispense with the pieces of metal U U', as the pressure will be equalized on the surface of the hoop and the tendency to swerve from a perpendicular and straight line will be neutralized. For making plain tires for plain railway wheels I pursue the same operation of either hammering or rolling with the exception of not flanging the tire, as hereinbefore exemplified and described. Tires for carriages and vehicles for common roads may also be made as also the rims of wheels to be afterward cut to form teeth upon their peripheries in the usual manner. Also hoops for various purposes may also be formed from solid bars of cast steel forged, expanded and finished by either hammering or rolling, as hereinbefore exemplified and described.

I am aware that tires have been made without welding, from a disk expanded from a center opening.

And having now described the nature of my said invention and the manner in which the same is to be performed I declare that what I claim is as follows:

I claim the making of tires, for railway, car and other wheels, out of solid bars of cast steel, without welding, slotted, open, expanded, and finished into the desired shape in the manner herein described.

ALFRED KRUPP.

Witnesses:
V. VON ERNSTHAUSEN,
CARL GANTESWEILER.